(12) United States Patent
Waldspurger et al.

(10) Patent No.: US 6,725,289 B1
(45) Date of Patent: Apr. 20, 2004

(54) TRANSPARENT ADDRESS REMAPPING FOR HIGH-SPEED I/O

(75) Inventors: Carl A. Waldspurger, Atherton, CA (US); Michael Nelson, Alamo, CA (US); Kinshuk Govil, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 196 days.

(21) Appl. No.: 10/124,783

(22) Filed: Apr. 17, 2002

(51) Int. Cl.[7] .................. G06F 12/00; G06F 12/08; G06F 12/10; G06F 13/00; G06F 17/00

(52) U.S. Cl. ................. 710/9; 718/1; 710/2; 710/3; 711/2; 711/100; 711/152; 711/165; 711/200; 711/202; 711/203; 711/205; 711/206; 711/207; 711/208; 711/209; 711/220; 711/221

(58) Field of Search ................. 718/1; 710/2, 3, 710/4, 8, 9; 711/1, 2, 3, 100, 152, 165, 200, 202, 203, 205, 206, 207, 208, 209, 218, 220, 221

(56) References Cited

U.S. PATENT DOCUMENTS

| | | | | |
|---|---|---|---|---|
| 4,835,734 A | * | 5/1989 | Kodaira et al. | 711/209 |
| 5,555,385 A | * | 9/1996 | Osisek | 711/1 |
| 5,577,231 A | * | 11/1996 | Scalzi et al. | 703/26 |
| 5,617,529 A | * | 4/1997 | Dao | 345/564 |
| 5,699,542 A | * | 12/1997 | Mehta et al. | 711/202 |
| 6,075,938 A | * | 6/2000 | Bugnion et al. | 703/27 |
| 6,125,430 A | * | 9/2000 | Noel et al. | 711/152 |
| 6,314,501 B1 | * | 11/2001 | Gulick et al. | 711/153 |
| 6,397,242 B1 | * | 5/2002 | Devine et al. | 718/1 |

* cited by examiner

Primary Examiner—Jeffrey Gaffin
Assistant Examiner—Tanh Nguyen
(74) Attorney, Agent, or Firm—Jeffrey Pearce

(57) ABSTRACT

A subsystem that is able to address a second memory region initiates I/O requests directed to a device that is able to address a first memory region that is different from the second memory region. Requests for memory are mapped at least once, for example from virtual to physical page numbers. The I/O requests are conditionally remapped to pages in the first region as a function of how often they are involved in the I/O operations and would normally otherwise need to be copied. Remapping may also be made conditional on a function of availability of memory in the first region. In a preferred embodiment of the invention, the I/O requests are initiated by a subsystem within a virtual machine, which runs via an intermediate software layer such as a virtual machine monitor on an underlying hardware and software platform. A typical application of the invention is DMA.

53 Claims, 3 Drawing Sheets

TRANSPARENT ADDRESS REMAPPING FOR HIGH-SPEED I/O

BACKGROUND OF THE INVENTION

1. Field of the Invention

This invention relates to the field of memory management in computers, in particular in the context of address mapping in order to improve I/O speed.

2. Description of the Related Art

Many computer systems depend for their speed and efficiency on the ability to rapidly transfer data between devices and system memory. In many cases, however, addressing conventions and restrictions make it necessary to perform intermediate copies of data to be transferred before the final transfer can actually take place. Such copying can severely slow down the transfer rate.

One widely used method for increasing the input/output ("I/O"—either or both) speed between certain devices (or other processes) and memory is known as "direct memory access" (DMA). DMA is a capability provided by some computer bus architectures that allows data to be sent directly from an attached device (such as a disk drive) to system memory, without intermediate action by the processor. In order to implement DMA, a portion of system memory is usually designated as an area to be used specifically for DMA operations. Obviously, time is lost whenever a block of data (such as a "page" that is not already in the designated memory portion) must be copied to or from the designated memory portion to perform a DMA transfer.

As a concrete example, modern Intel x86 processors support a physical address extension (PAE) mode that allows the hardware to address up to 64 GB of memory using 36-bit addresses. Unfortunately, many devices that directly access memory to perform I/O operations can address only a subset of this memory. For example, network interface cards with the common 32-bit PCI (Peripheral Component Interconnect) interface can address memory residing in only the lowest 4 GB of memory, even on systems that support up to 64 GB of memory. Other 32-bit PCI devices can access memory above 4 GB using a technique known as DAC (Dual Address Cycle), but this technique requires two address transfers—one for the low 32 bits and another for the high 32 bits.

One known way to support output to "high" memory (that is, memory above 4 GB) is to copy the data from high memory to a temporary buffer in "low" memory for the DMA operation. For input operations, a portion of low memory in the temporary buffer is allocated for storage of the input data, which can then be copied to high memory. This technique is employed, for example, by the Linux 2.4 kernel, which uses the term "bounce buffer" to describe the temporary buffering and copying process. Unfortunately, copying can impose significant overhead, which results in turn in increased latency, reduced throughput, and/or increased CPU load when performing I/O.

Another known technique is the remapping of memory regions (in particular, pages) as described in U.S. Pat. No. 6,075,938, Bugnion, et al., "Virtual Machine Monitors for Scalable Multiprocessors," issued Jun. 13, 2000 ("Bugnion '938"). The basic idea of this system, which operates in the context of a NUMA (non-uniform memory access) multi-processor, is that memory pages associated with hardware memory modules that are farther away (defined in terms of access latency) are migrated or replicated by making copies in hardware memory modules closer to a process that is accessing them. The process page mappings are modified transparently to use the local page copy instead of the original remote page. In other words, the Bugnion '938 system attempts to improve access speed by improving memory locality. The problem when it come to I/O, in particular in the context of DMA, is, however, not that of whether a certain memory space is sufficiently local, but rather, often, whether it can be accessed at all.

Still other existing systems enable I/O to "high" memory by including special hardware components that provide support for memory remapping. For example, a separate I/O memory management unit (I/O MMU) may be included for I/O operations. The obvious disadvantage of this solution is its requirement for the extra hardware.

A related problem is the dynamic management of the "low" memory, which may be a scarce resource that needs to be allocated among various competing uses. In other words, if several devices or processes must compete for use of a common memory region (here, "low") designated for high-speed I/O (such as DMA), then some mechanism must be provided to efficiently allocate its use. Such memory management is typically carried out by a component of the operating system.

What is needed is therefore a system that eliminates or at least reduces the need for copying in I/O operations to or from at least one limited memory space, especially in high-speed I/O contexts such as DMA. The system should preferably be usable not only in a conventional computer system, in particular, in its operating system, but also in computer systems that include at least one virtualized computer. Moreover, the system should preferably also be able to manage the limited memory space dynamically, and it should not require specific hardware support. This invention provides such a system and method of operation whose various aspects meet these different goals.

SUMMARY OF THE INVENTION

The invention provides a method and corresponding system implementation for performing an input/output (I/O) operation in a computer between an I/O-initiating subsystem and a device through a memory, where the memory is arranged into portions such as pages that are separately addressable using first identifiers, such as page numbers. It is assumed that, for the I/O operation, the device accesses a device-accessible space of the memory, whereas the subsystem addresses I/O requests using second (or, in the preferred virtualized embodiment, third) identifiers to some other memory space, in particular to a space of the memory that is inaccessible to the device. In other words, the subsystem does not normally address I/O requests to the region of the memory that the device accesses for I/O operations. One example of this would be DMA where the device addresses only a lower address region of the memory but the I/O-initiating subsystem addresses its requests to an upper address region.

According to the invention, a manager, in particular, a memory map within the manager, initially maps the second identifiers to respective first identifiers that identify portions of the memory in the device-inaccessible memory space. For any I/O request that meets a remapping criterion, a remapping module in the manager remaps the corresponding second identifier to one of the first identifiers that identifies a portion of the memory in the device-accessible space of the memory.

In cases where the I/O operation is output of a data set from the subsystem to the device, that is, a "write," then for any I/O request that meets the remapping criterion, and for as long as the I/O request meets the remapping criterion, the manager creates and maintains a single copy of the data set in a buffer in the device-accessible space of the memory and remaps the I/O request to the single copy. For any I/O request that fails to meet the remapping criterion, a new copy of the data set is preferably created in the buffer upon each instance of the I/O request.

In the cases where the I/O operation is input of a data set from the device to the subsystem, that is, a "read," then, for any I/O request that meets the remapping criterion, the data set from the device is preferably stored in the device-accessible space of the memory at a location identified by the first identifier to which the second identifier has been remapped.

One way according to the invention to decide which second identifiers are to be remapped to the device-accessible space of the memory is to calculate an activity score for at least a subset of the second identifiers used by the subsystem in an I/O request during a current measurement period. The second identifier is then remapped if its activity score exceeds a high-activity threshold value. The activity score may be calculated in different ways, for example, as a function of the frequency of use in I/O requests by the subsystem of the respective second identifier. The frequency may be determined over some current activity interval, or over both a current activity interval and over at least one previous activity interval.

According to one aspect of the preferred embodiment of the invention, each second identifier that is currently mapped into the device-accessible space of the memory and that meets a remapping condition is again mapped into the device-inaccessible space of the memory. Identifiers may be chosen randomly for mapping back into the device-inaccessible space of the memory, or they may be chosen because their activity score falls below a low-activity threshold during a most recent activity interval, etc. If the mapping for a particular second identifier is changed back to the device-inaccessible space of the memory, then the portion of the memory in the device-accessible space to which the second identifier had previously been remapped may be freed for reallocation.

Remapping may also, or alternatively, be conditioned on and adjusted as a function of a measure of scarcity of the portions of the memory in the device-accessible space that are available for allocation.

Yet another criterion that may be used instead of or in addition to those mentioned above is that the current cost of remapping for the current I/O request is less than a cost threshold. The manager then preferably includes a cost-evaluation module to calculate cost according to the chosen definition of cost.

In the preferred embodiment of the invention, the I/O-initiating subsystem is included within a guest system that runs on a host platform. An additional degree of addressing indirection is thereby introduced, such that I/O requests issued by the I/O-initiating subsystem are first remapped from third identifiers to the second identifiers within the guest system. The remapping of the second identifiers to the first identifiers is then done in the manager such that the remapping remains transparent to both the I/O-initiating subsystem and the guest system.

The preferred embodiment of the invention is virtualized, meaning that the guest system is a virtual machine that has a guest operating system and that runs on the underlying hardware host via an intermediate software layer such as a virtual machine monitor. In this virtualized embodiment, the I/O-initiating subsystem is in the virtual machine (for example, an application, or even the guest operating system itself) and the actual I/O operation is between the I/O-initiating subsystem and a physical device through a hardware memory. The first identifiers thereby identify portions of the hardware memory.

Although actual I/O is to and/or from the physical device through the hardware memory, the I/O-initiating subsystem directs its I/O requests, using third identifiers, to a virtual device through a virtual memory. The I/O requests issued by the I/O-initiating subsystem are then remapped by the guest operating system from the third identifiers to second identifiers, which identify portions of the virtual memory. The manager is in this case in the intermediate software layer, which maintains a map of either the second or third (or both) identifiers to the first identifiers. Remapping to and from the physical device-accessible space of the hardware memory is then done as above, on the basis of the activity of either the second or the third identifiers.

The transparent remapping mechanism according to the invention may alternatively be used to remap second (or third) identifiers that identify contiguous memory portions such that the first identifiers to which they are remapped correspond to contiguous portions of the device-accessible space.

DETAILED DESCRIPTION

Figure 1:
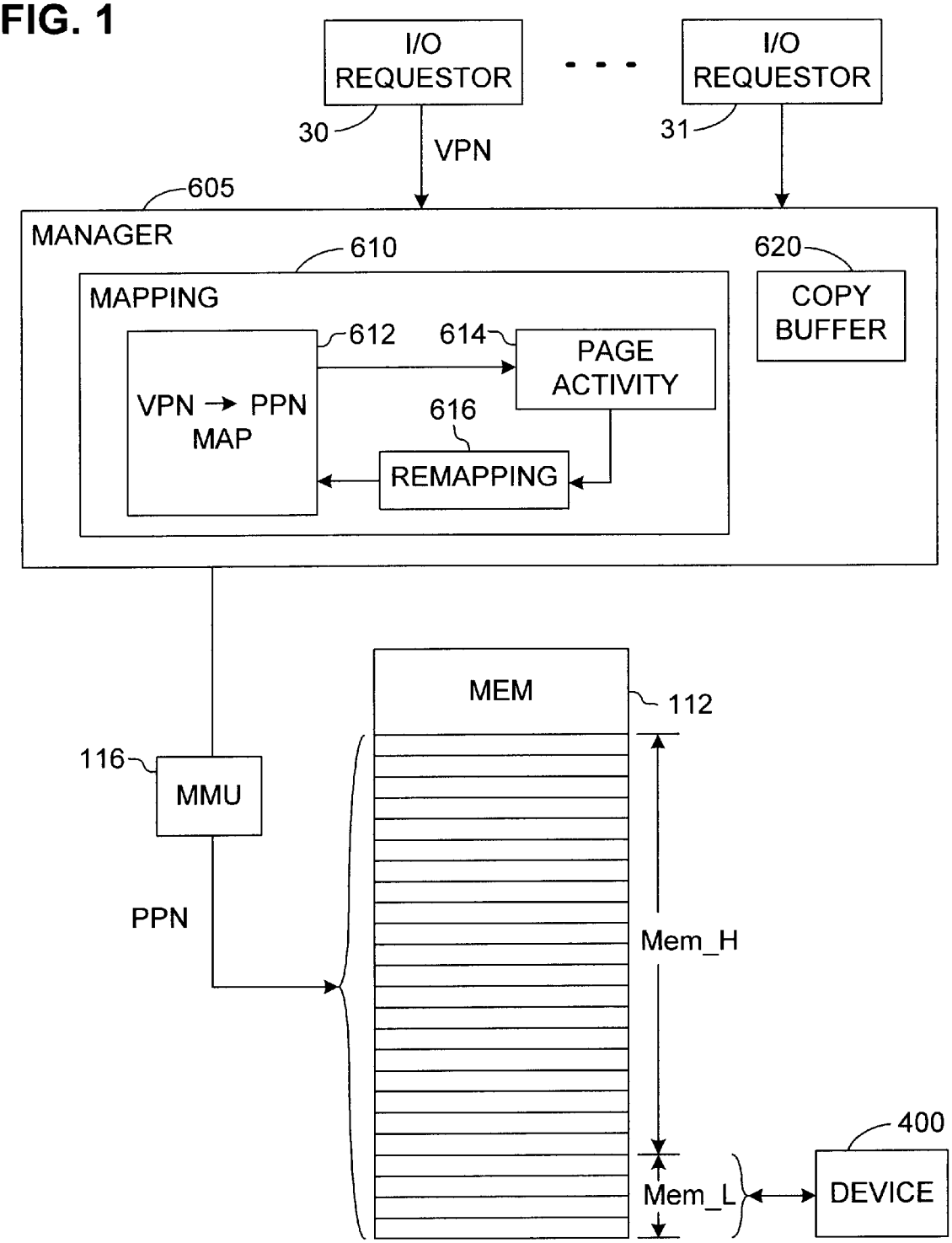
FIG. 1 illustrates a generalized embodiment of the invention in the case where memory addresses issued by an I/O-initiating subsystem undergo a single mapping in order to address the actual system memory for the purpose of I/O.

FIG. 1 shows a generalized embodiment of the invention, and also serves to illustrate the concepts used in other embodiments of the invention as well. In FIG. 1, one or more subsystems 30, . . . , 31, implemented in either software or hardware or a combination of both, initiates an I/O request to a device 400, which is able to access only a portion of the total memory space of a memory 112. Of course, as in other computer systems, the system according to the invention includes a hardware platform with one or more processors and supporting components, as well as system software such as an operating system (OS), etc.; these known system components (both hardware and software) are not shown in FIGS. 1 and 2 for the sake of simplicity but can be assumed to be present.

In most applications of the invention, it is anticipated that the device 400 will be one or more physical devices. The invention may also be used, however, even where the "device" is a software construct, that is, a virtualized device.

In the following description of the invention, the portion of the memory space that the device 400 can access is referred to as the "low" memory Mem_L, with the remaining memory space referred to as "high" memory Mem_H, only for the sake of ease of understanding and illustration. Note that this nomenclature also corresponds to the example mentioned above, namely, the case in which the device is a network interface card that can address memory residing in only the lowest 4 GB of memory, even on systems that support much larger memory address spaces.

In general, the invention is applicable whenever the addressable space of the device is not identical to the addressable space of the subsystem that is requesting I/O. This may be the case for any of several reasons. For example, the subsystem may be restricted to accessing some portion of high memory either by its own design, or in order to maintain isolation from other subsystems. Another example is where the device with which the subsystem believes it is interacting is actually an emulation that is addressed in high memory, with an intermediate subsystem acting as an interface to the physical device 400, which addresses only low memory; this example is explained in greater detail below.

The memory space addressable by the device need not be ordered numerically "lower" than the memory space that it cannot address, and it need not be contiguous, although this will be the most common arrangement where the operation to be supported is DMA. The term "low memory" is therefore to be understood simply as the portion of the memory that the device 400 is able to address; the term "high memory" is the portion that the device cannot or for some other reason does not address, but that the subsystem requesting a current I/O operation can address (directly or indirectly).

As is well known, in most modern computer architectures, system memory is typically divided into individually addressable units or blocks commonly known as "pages," each of which in turn contains many separately addressable data words, which in turn will usually comprise several bytes. In Intel x86 systems, for example, each page comprises 4096 bytes. Pages are identified by addresses commonly referred to as "page numbers." The invention does not presuppose any particular page size.

In broadest terms, the invention provides a mechanism that takes a request for I/O of data residing on one or more pages, and under certain conditions remaps the request from high memory to low memory. Thanks to the remapping procedure according to the invention, there is no need to create a copy of the page(s) for each I/O operation, but rather only a single copy need be created as long as remapping is in effect; no copying may be required at all for some read operations.

Note that the actual data involved in a given I/O operation need not occupy an entire page. In other words, the I/O granularity may be smaller than the granularity of memory allocation. Three of the many cases in which this is true are DMA, which may involve data blocks as small as single data words or even bytes; packets in a packet-based network transfer, which commonly require fewer than 1600 bytes each out of a standard 4096-byte page; and disk transfers, which typically take place in 512-byte sectors. Even in these cases, in which the I/O data occupies only a subset of a page, a page is usually the smallest unit of memory that can be remapped.

As FIG. 1 shows, the invention includes a subsystem, shown as the "manager" 605, which acts as an interface or intermediary between the subsystem that is requesting I/O on the one hand, and the memory 112 and the device 400 on the other hand. It is assumed that the manager 605 is able to detect which pages the subsystem 30 is designating for a current I/O operation with the device 400. In embodiments of the invention such as the one shown in FIG. 1, the manager 605 will typically be a component of the operating system; an alternative configuration is described below.

Memory Mapping and Address Terminology

The most straightforward way for all components in a computer to uniquely identify a memory page would be for them all simply to use a common set of page numbers. This is almost never done, however, for many well-known reasons. Instead, user-level software normally refers to memory pages using one set of identifiers, which is then ultimately mapped to the set actually used by the underlying hardware memory.

When a subsystem 30 requests access to the memory 112, for example, the request is issued usually with a "virtual address," since the memory space that the subsystem addresses is a construct adopted to allow for much greater generality and flexibility. The request must, however, ultimately be mapped to an address that is issued to the actual hardware memory. This mapping, or translation, is typically specified by the operating system (OS). The OS thus converts the "virtual" page number (VPN) of the request into a "physical" page number (PPN) that can be applied directly to the hardware.

For example, when writing a given word to a virtual address in memory, the processor breaks the virtual address into a page number (higher-order address bits) plus an offset into that page (lower-order address bits). The virtual page number (VPN) is then translated using mappings established by the OS into a physical page number (PPN) based on a page table entry (PTE) for that VPN in the page table associated with the currently active address space. The actual translation may be accomplished simply by replacing the VPN (the higher order bits of the virtual address) with its PPN mapping, leaving the lower order offset bits the same.

Normally this mapping is performed within a hardware memory management unit (MMU) 116 and is obtained quickly by looking it up in a hardware structure known as a translation lookaside buffer (TLB); if not, a "TLB miss" occurs, and the page tables in memory are consulted to update the TLB before proceeding. The operating system thus specifies the mapping, but the hardware MMU 116 usually actually performs the conversion of one type of page number to the other. Below, for the sake of simplicity, when it is stated that a software module "maps" pages numbers, the existence and operation of a hardware device such as the MMU 116 may be assumed.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579–603 (chapter 7.4 "Virtual Memory"). In the generalized embodiment of the invention shown in FIG. 1, the manager 605 includes a mapping module 610 that includes a map 612 of VPNs to PPNs. For each VPN issued by the subsystem 30, the manager can therefore determine which corresponding PPN is to be used to address the physical memory 112.

Figure 2:
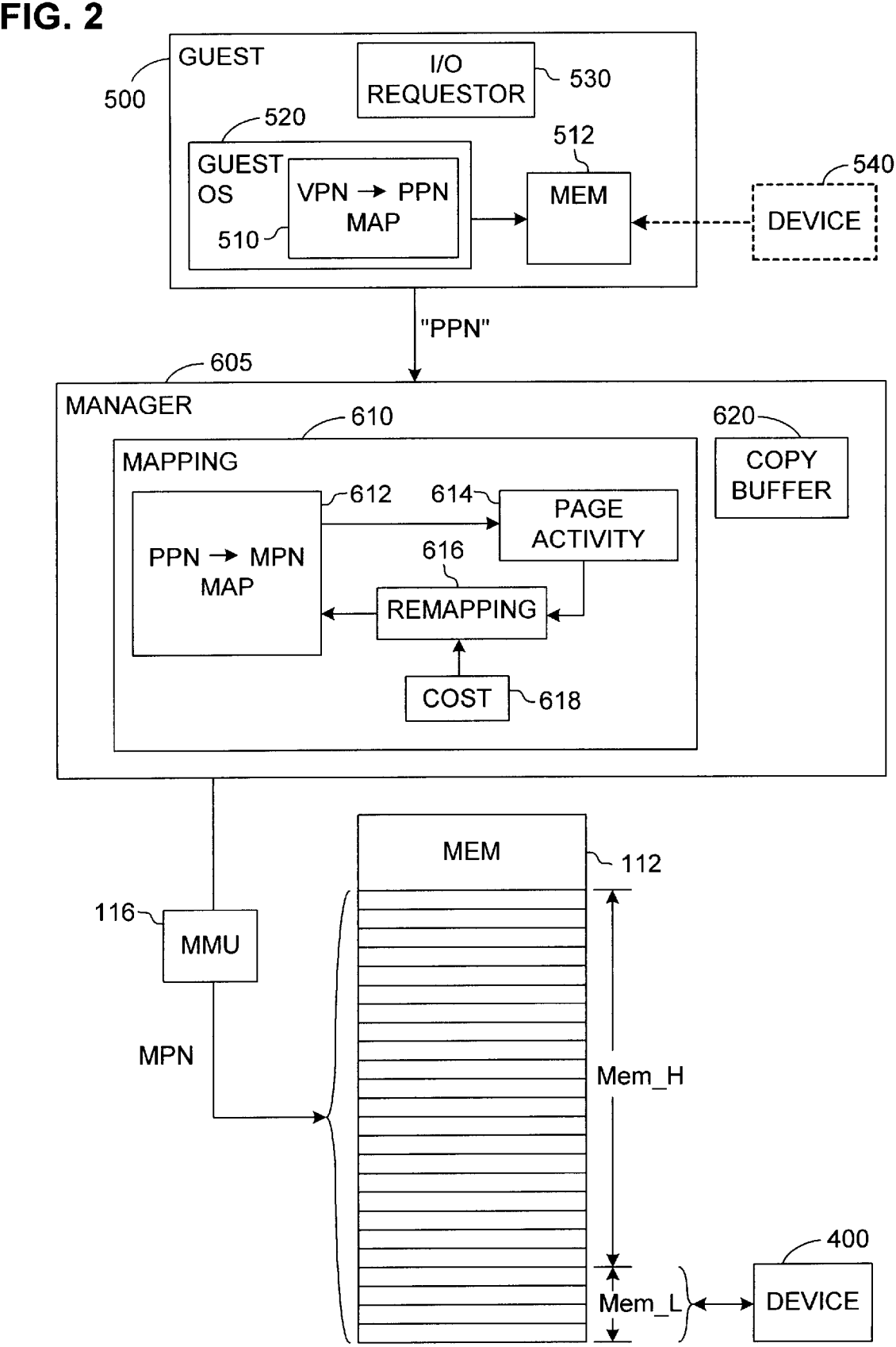
FIG. 2 illustrates a generalized embodiment of the invention in the case where memory addresses issued by an I/O-initiating subsystem undergo at least two mappings before they are used to address the actual system memory.

FIG. 2 illustrates a system in which memory is addressed using a second level of indirection, that is, where the VPN issued by a subsystem 530 is remapped twice in order to determine which page of the hardware memory is intended. In this embodiment, the subsystem 530 is included within a guest system 500, which includes its own guest operating system 520 or equivalent system software, as well as a guest memory 512, which may in actual implementations be a designated subset of the memory space of the hardware memory 112. The guest assumes that the device 540 with which the subsystem 530 is attempting an I/O operation is the device that will actually carry out the intended I/O operation, and it assumes that the device 540 addresses the guest memory 512.

In other words, at least with respect to I/O between the subsystem 530 and the device 540, the guest 500 acts as a normal computer system. In fact, however, the device 540 is either a software construct, such as an emulator, or for some other reason not the actual hardware device 400 that is to carry out the requested I/O operation.

When the subsystem requests I/O of data residing on a page, it therefore designates a VPN as usual. A mapping module 510 within the guest OS then translates this VPN into a corresponding PPN in the conventional manner and then uses this PPN as usual to address the memory 512. The guest OS therefore "believes" that it is directly addressing the actual hardware memory via which the I/O is to occur, but in fact it is not. Of course, since the device 540 is not a "real" I/O device, actual transfer must ultimately be arranged with the hardware device 400.

In the embodiment shown in FIG. 2, it is assumed that all I/O requests of the guest system 500, at least those involving the device 400, are detected and handled by the manager 605. The manager 605 therefore intercepts the PPN issued by the mapping module 512 (or the original VPN) and maps it to the actual page number used by the hardware memory. In this multiple-mapped embodiment, the page numbers used to address the hardware memory 112 are referred to as "machine page numbers" (MPNs). The memory mapping module 612 in the manager 605 is therefore shown in FIG. 2 as mapping PPNs to MPNs.

FIG. 2 therefore illustrates a configuration in which the guest system 500 may be entirely a software construct, or at least a system whose actual execution is handled in whole or in part by an underlying software and hardware platform. In other words, at least some of the hardware structures that the guest OS assumes are handling the actual I/O operation are in fact virtualized. In the preferred embodiment of the invention described below, the guest system is virtual machine, with all essential hardware structures implemented in software. Any single-mapping embodiment of the invention, which has the general structure shown in FIG. 1, is therefore referred to here as "non-virtualized" embodiment or configuration, whereas embodiments having the general structure shown in FIG. 2 are referred to as "virtualized" embodiments or configurations. Note that from the perspective of the manager 605, the guest system 500 can be considered to be a subsystem that is issuing the I/O request, even though it may carry out internal address mappings of its own.

Because of the additional degree of addressing indirection introduced by virtualization, the concept of a physical page number (PPN) differs in non-virtualized and virtualized embodiments of the invention. In particular, in virtualized embodiments of the invention, the definition of a PPN deviates from the "standard" definition. As used in herein, the definitions of VPN, PPN and MPN are as follows:

Non-Virtualized Configuration:

VPN: A virtual page number associated with a process.

PPN: A physical page number that refers to the actual hardware memory. The operating system, in particular, the mapping module 610, specifies mappings from VPNs to PPNs, and the hardware MMU 116 then performs the actual translation of VPNs to PPNs using these mappings.

MPN: A machine page number, identical to PPN.

Virtualized Configuration:

VPN: A virtual page number associated with a subsystem running in or on a guest OS.

PPN: A physical page number that refers to a virtualized physical memory space associated with the guest. As is mentioned above, the guest operates as though this PPN refers to actual hardware memory, although it is actually a software construct maintained by the guest software layer. The guest OS specifies mappings from VPNs to PPNs.

MPN: A machine page number that refers to actual hardware memory 112. The intermediate software layer (for example, a virtual machine monitor VMM acting as the manager 605) specifies mappings from each VM's PPNs to MPNs. This adds an extra level of indirection, with two address translations (mappings) instead of one: a VPN is translated to a PPN using the guest OS mappings, and then this PPN is mapped to an MPN by the manager. In order to eliminate one mapping operation while still maintaining the extra degree of addressing indirection, the manager may instead (or, if needed, in addition) maintain a separate page table from VPNs to MPNs, so that the hardware MMU 116 can translate VPNs directly to MPNs, and remap them as described below.

Note that the page-mapping operation within the manager 605 may be kept transparent to the guest 500 that is requesting I/O. Consequently, as long as the corresponding I/O operation is carried out, the guest system is unaware of and unaffected by the mapping used to address the hardware memory.

Preferred Virtualized Embodiment

Figure 3:
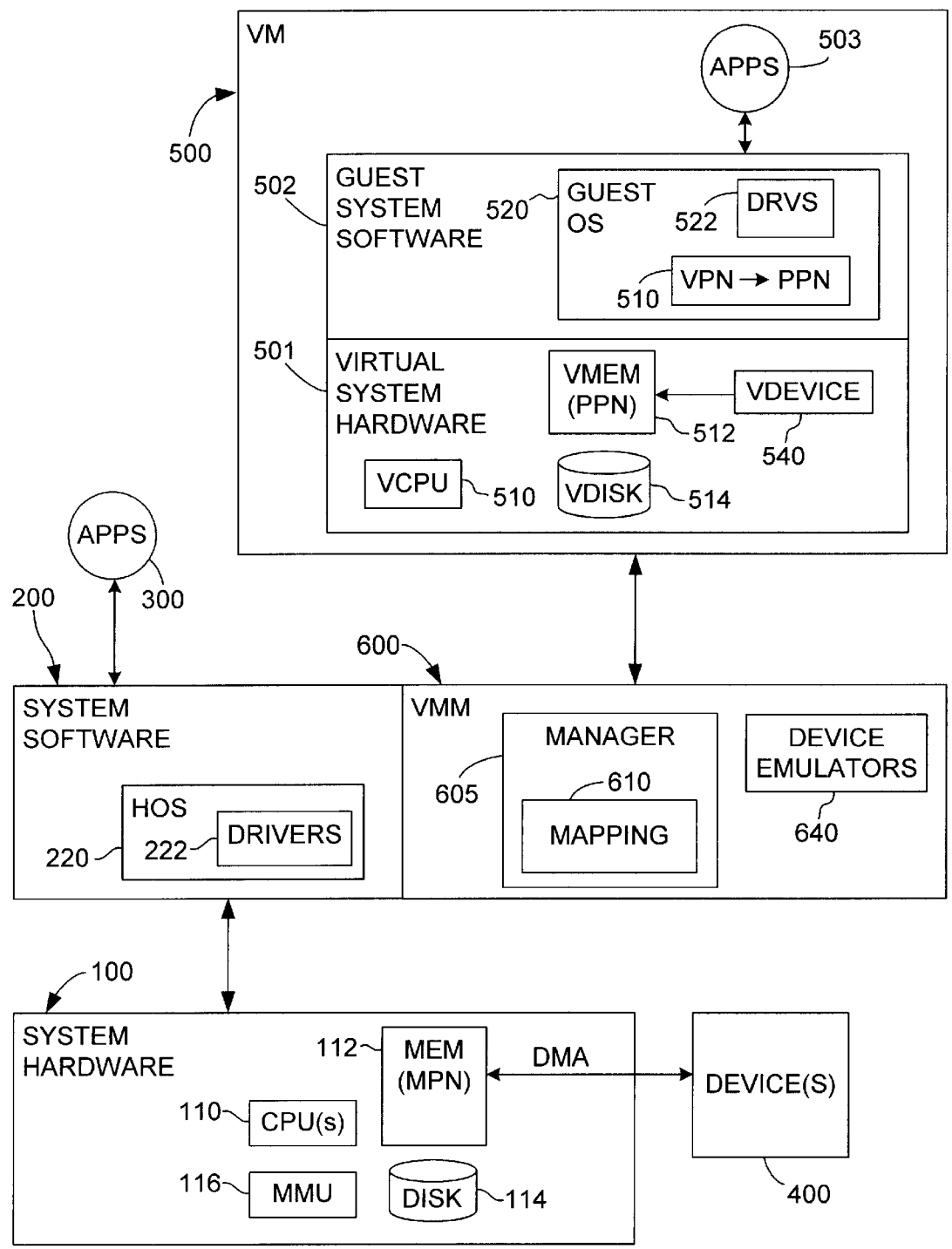
FIG. 3 is a block diagram of the preferred embodiment of the invention, in which I/O via system memory is initiated by an I/O-initiating subsystem running on a guest operating system within a virtual machine, which in turn is running on an underlying host platform.

FIG. 3 illustrates the main components of the preferred, virtualized embodiment of the invention, in which the guest is a software construct known as a "virtual computer" or "virtual machine" (VM) 500 (a special case of the guest 500 shown in FIG. 2). Reference numerals in FIG. 3 that are the same as in FIG. 2 therefore refer to corresponding components and features. As in conventional computer systems, the virtualized embodiment includes both system hardware 100 and system software 200. The system hardware 100 includes one or more central processors CPU(s) 110, which may be a single processor, or two or more cooperating processors in a known multiprocessor arrangement. As in most computers, one or more disks 114 are usually included in addition to the system memory 112. The system hardware usually also includes, or is connected to, conventional registers, interrupt-handling circuitry, a clock, etc., as well as the memory management unit MMU 116.

The device 400 that is to directly access the memory 112 in accordance with an I/O request from the VM is either part of the system hardware 100, or is connected to the hardware 100 as a peripheral. Just two of the many possible examples of devices that may be configured for DMA according to the invention are the disk 114 itself (which is an example of a device that is also part of the system hardware) and a network interface card.

The system software 200 either is or at least includes an operating system OS 220, which will include drivers 222 as needed for controlling and communicating with various devices, usually including the disk 114. Conventional applications 300, if included, may be installed to run on the hardware 100 via the system software 200.

As is well known in the art, a virtual machine (VM) is a software abstraction—a "virtualization"—of an actual physical computer system. As such, each VM will typically include virtualized ("guest") system hardware 501 and guest system software 502, which are software analogs of the physical hardware and software layers 100, 200. Note that although the hardware "layer" 501 will be a software abstraction of physical components, the VM's system software 502 may be the same as would be loaded into a "real" computer. The modifier "guest" is used here to indicate that the various VM software components, from the perspective of a user, are independent, but that actual execution is carried out on the underlying "host" hardware and software platform 100; 200. The guest system hardware 501 includes one or more virtual CPUs 510 (VCPU), virtual system memory 512 (VMEM), a virtual disk 514 (VDISK), and at least one virtual device 540 (VDEVICE), all of which are implemented in software to emulate the corresponding components of an actual computer. Of particular relevance here is that, from the perspective of the VM, the virtual device 540 is a software analog of the hardware device 400. Thus, I/O to the virtual device will actually be carried out by I/O to the hardware device 400, but in a manner that is transparent to the VM.

The guest system software 502 includes a guest operating system 520, which may, but need not, simply be a copy of a conventional, commodity OS, as well as drivers 522 (DRVS) as needed, for example, to control the virtual device 540. The guest OS also includes the page map 510.

Of course, most computers are intended to run various applications, and a VM is usually no exception. Consequently, by way of example, FIG. 3 illustrates one or more applications 503 installed to run on the guest OS 520; any number of applications, including none at all, may be loaded for running on the guest OS, limited only by the requirements of the VM. The subsystem that issues the I/O request and the corresponding VPN(s) may be any of the applications 503, some subsystem within the guest OS 520, or possibly some other virtual device than device 540.

If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. FIG. 3 illustrates a single VM 500 merely for the sake of simplicity; in many installations, there will be more than one VM installed to run on the common hardware platform; all will have essentially the same general structure, although the individual components need not be identical.

Some interface is usually required between the VM 500 and the underlying "host" hardware 100, which is responsible for actually executing VM-related instructions and transferring data to and from the actual, physical memory 112. One advantageous interface between the VM and the underlying host system is often referred to as a virtual machine monitor (VMM). Virtual machine monitors have a long history, dating back to mainframe computer systems in the 1960s. See, for example, Robert P. Goldberg, "Survey of Virtual Machine Research," IEEE Computer, June 1974, p. 54–45. A VMM is usually a relatively thin layer of software that runs directly on top of a host, such as the system software 200, or directly on the hardware, and virtualizes the resources of the (or some) hardware platform. The VMM will typically include at least one device emulator 640, which may also form the implementation of the virtual device 540. The interface exported to the respective VM is usually such that the guest OS 520 cannot determine the presence of the VMM. The VMM also usually tracks and either forwards (to the host OS 220) or itself schedules and handles all requests by its VM for machine resources as well as various faults and interrupts. The general features of VMMs are known in the art and are therefore not discussed in further detail here.

In FIG. 3, a single VMM 600 is shown acting as the interface for the single VM 500. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention described below works with all such VM/VMM configurations.

The important point is simply that some well-defined interface should be provided between each installed VM 500 and the underlying system hardware 100 and that this interface should contain a manager 605 that is structured and functions as the manager 605 in FIG. 2. Consequently, instead of a complete VMM, in order to implement the invention, the manager 605 (in FIG. 2, manager 605) may be included in the host OS 220 or in some other system-level software layer. One advantage of including the manager 605 in the VMM is that this will not require modification of the host OS 220.

In some configurations, the VMM 600 runs as a software layer between the host system software 200 and the VM 500. In other configurations, such as the one illustrated in FIG. 3, the VMM runs directly on the hardware platform 100 at the same system level as the host OS. In such case, the VMM may use the host OS to perform certain functions, including I/O, by calling (usually through a host API—application program interface) the host drivers 222. In this situation, it is still possible to view the VMM as an additional software layer inserted between the hardware 100 and the guest OS 520. Furthermore, it may in some cases be beneficial to deploy VMMs on top of a thin software layer, a "kernel," constructed specifically for this purpose.

In yet other implementations, the kernel takes the place of and performs the conventional functions of the host OS. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 220 of the underlying physical computer, or whatever system-level software handles actual I/O operations, takes faults and interrupts, etc. for the VM. The invention may be used in all the different configurations described above.

In addition to controlling the instruction stream executed by software in virtual machines, the VMM also controls other resources in order to ensure that the virtual machines remain encapsulated and do not interfere with other software on the system. First and foremost, this applies to I/O devices, but also to interrupt vectors, which generally must be directed into the VMM (the VMM will conditionally forward interrupts to the VM). Furthermore, the memory management (MMU) functionality normally remains under control of the VMM in order to prevent the VM from accessing memory allocated to other software on the computer, including other VMs. In short, the entire state of the VM is not only observable by the VMM, but the entire operation of the VM is under the control of the VMM.

Remapping

As FIGS. 1 and 2 show, the mapping module 610 in the manager 605 (or in the VMM 600—FIG. 3) according to the invention includes a page activity module 614 and a remapping module 616, which together implement the main novel features of the invention. The manager preferably also includes a page copy buffer 620, which may be implemented as an explicitly-designated structure in low memory, or simply by allocating memory out of a general, limited "low memory pool" to perform remapping.

This buffer 620 is used as in conventional systems: as needed, I/O to "high" memory is supported by the manager temporarily copying data into the low-memory buffer 620. The buffer 620 is therefore equivalent to the "bounce buffer" described above. Unlike in the prior art, however, the buffer as used in this invention is not always needed for "high-memory" page I/O. The size of the buffer 620 may be fixed at a size determined using normal design methods, or it may be allowed to grow and shrink as a function of current need and low-memory availability. Recall that, for output operations, data will be copied into the buffer page(s) from the subsystem requesting the operation to the device, whereas, for input operations, the page(s) will be allocated for storage of data received from the device, after which the pages will be available for access by the requesting subsystem. Note that at least a partial page copy may be needed for input (read) operations in that case where the read involves only part of a page: A copy should then be made of at least the rest of the page, that is, the part not involved in the read operation.

The main idea of the invention is that a page that is frequently involved in I/O operations, and that would normally need to be copied through the buffer 620 upon each I/O operation involving that page, is instead transparently remapped into low memory. In other words, the VPN→PPN (non-virtualized embodiment) or the PPN→MPN (virtualized embodiment) mapping for highly active or "hot" pages is changed within the manager 605 so as to map directly into low memory.

In the virtualized embodiment of the invention, if a separate PPN→MPN map is maintained in the manager, then remapping may be done by changing this mapping instead, or in addition, to the PPN—MPN mapping. Because this mapping/remapping takes place at a functional level between that of the guest and host systems, whichever set of page numbers (VPN or PPN) are used in the remapping process, they can be considered to be "intermediate" identifiers of the pages involved. Remapping according to the invention is discussed below in the context of changing PPN→MPN mappings simply by way of example.

Let MPN_L(j) and MPN_H(k) represent pages in low and high memory Mem_L. Mem_H, respectively. For example, MPN_L(j) might be any page in the lowest 4 GB of system memory, and MPN_H(k) is any page with a hardware address above 4 GB. Using the transparent remapping method according to the invention, for each highly active page PPN(i), the mapping module 610, in particular, its remapping component 616, allocates a machine page in low memory (MPN_L(j)), copies the data to be transferred from the original page in high memory (MPN_H(k)) into the low page (MPN_L(j)), and then changes the corresponding PPN→MPN mapping from PPN(i)→MPN_H(k) to PPN(i)→MPN_L(j). For the non-virtualized embodiment, or for the virtualized case in which the manager maintains a separate VPN→MPN map, the PPN→MPN mapping is changed from VPN(i)→MPN_H(k) to VPN(i)→MPN_L(j). The original page (MPN_H(k)) can then be reclaimed using conventional mechanisms. Note that it is possible that a particular VPN or PPN might be already mapped to low memory for some other reason, that is, at least initially not as a result the remapping procedure of the invention; the invention may be used to manage mapping and remapping of such pages as well.

In order for the manager to efficiently remap highly active, "hot" pages, it is necessary to determine just what these pages are. According to one method used in a prototype of the invention, the manager 605 includes, as part of the page activity module 614, a relatively small (in the prototype, 256 entries) hash table that is entered using the eight least significant (low-order) bits of PPNs used in I/O operations as the index. (Of course, a hash table of different size will be indexed using a different number of PPN bits.) The remaining higher order bits of each PPN thereby form its "tag." Each entry of the table includes the tag (or, alternatively, the full PPN) of the of the most recently issued PPN that hashes to the given index, the MPN to which the PPN is currently mapped (alternatively, a single bit that indicates whether it is currently mapped to high or low memory), and a count of the number of times this PPN has been issued. The table is evaluated periodically and any PPN(i) whose count exceeds a predetermined threshold is then selected for remapping into low memory.

It is of course possible that two different PPNs will be issued that hash to the same entry in the table. Storing the tag of the most recently issued PPN allows the page activity module 614 to avoid ambiguity, but it is still possible that a currently issued PPN will cause the entry of the earlier PPN to be overwritten. This method for measuring the activity of PPNs (using the count) therefore represents one choice in the trade-off between accuracy of activity measurement and ease of implementation—the hash table is efficient and very easy to implement, but measures activity only approximately, and only for at most the number of PPNs equal to the number of entries in the table. By maintaining counts only for pages in the table, this technique uses very little space compared with techniques that store counts for all pages in the system, and will be acceptable in many actual implementations of the invention. The hash table-based technique for measuring PPN activity is not, however, the only choice in the trade-off of accuracy vs. simplicity.

Another method for measuring page activity according to the invention is for the page activity module 614 to compute, preferably for each PPN(i) in the map 612 (or for each VPN, if a separate list of VPNs is maintained), a corresponding activity score a(i) as a function of statistics of use of the respective PPN(i). In order to reduce space requirements, it would also be possible to calculate activity scores for only a subset of the pages in the system, for example, the subset of pages currently resident in a limited-size table such as a cache established for the purpose, or even a randomly selected subset of PPNs in use. The different values of a(i) may be maintained as a vector that augments the PPN→MPN map 612; any suitable, known indexing scheme may be used to associate a(i) with its respective PPN(i).

Activity may be measured in various ways, such as the number of I/O requests for page PPN(i) per unit time or over some time interval, or the number of times page PPN(i) must be copied, or the ratio of requests for I/O of PPN(i) relative to total I/O requests over some time interval, etc. Each of these measures of activity may be stored simply by augmenting the map 612 to include the score a(i) for each PPN(i). Note that time may be measured in either the real sense, that is, system time, or as a function of CPU cycles, or as a function of the virtual time in which the VM is running, or according to any other predetermined definition.

Assume that the PPN→MPN mappings are such that all PPNs are initially mapped to high memory, that is each PPN(i) is initially mapped to some MPN_H(k). Whenever the activity score a(i) of page number PPN(i) exceeds a high-activity threshold value $\tau_H$, and assuming that not all low memory pages MPN_L(j) are currently the target of a PPN→MPN_L mapping, the remapping module 616 then changes the mapping of PPN(i) from high memory to low memory. In other words, if a(i)>$\tau_H$, then the initial mapping PPN(i)→MPN_H(k) is changed to PPN(i)→MPN_L(j), where MPN_L(j) is any currently free MPN in low memory.

The value of the high-activity threshold $\tau_H$ may be determined using conventional testing and design methods and will depend on such factors as the anticipated amount of I/O, the amount of low memory available, etc. Note that the threshold $\tau_H$ may also be a parameter that is calculated based on the demand for low memory during some interval, on the proportion of low memory that is currently free, or on some combination of these or other factors. The threshold $\tau_H$ for remapping into low memory may thus be made to rise/fall as the demand for low memory increases/decreases or as it becomes more used up/free.

The decision to remap a page into low memory Mem_L of course increases the demand for low pages, which may be a scarce resource. The activity score a(i) for each PNN(i) is therefore preferably recalculated from time to time so that a PPN that has been remapped to low memory will not remain so mapped if the advantage of doing so decreases or disappears. A PPN→MPN_L mapping should not be allowed to remain if the corresponding PPN is being used in I/O relatively infrequently, and low memory pages are scarce. Such recalculation may be performed periodically, after each or a certain number of I/O request(s) for the respective PPN(i) or for any mapped PPN, or according to some other predetermined schedule or according to other predetermined conditions. Note that a PPN(i) that is currently mapped into low memory should preferably be mapped back into high memory only if this would free up a low page that could be put to more productive use for another remapping, that is for an even more active PPN, in order to reduce aggregate copying. If plenty of low memory is available, or there are no more deserving (that is, more active) remap candidates, then mapping back into high memory will not be necessary.

The level of scarcity of low memory may be measured in different ways. It will usually be impractical or even impossible, however, to determine how many pages of low memory are "active" and actually needed by a process. One way to deal with this is for the manager to always keep some amount of low pages in reserve and then to use a simple "low watermark" threshold to determine when to start reclaiming via low-to-high memory remapping.

Indirect and approximate estimates of scarcity may also be used. In order to determine one such indirect measure of low-memory availability the manager 605, the remapping or cost modules 616, 618 (for example) could keep track of how often requested low pages are unavailable. The ratio ρ of failed to total low-memory allocations can then be taken as an approximation of the degree of scarcity of low memory.

One way to avoid "overpopulation" of low memory is to reclaim low pages (via low-to-high memory remapping) randomly. According to this easily implemented procedure, when the number of available low memory pages drops below some threshold, then the remapping module 616 picks at random a PPN currently mapped to a low MPN, and then remaps it back to high memory in order to free up the low page. Note that if the randomly selected PPN is actually being used heavily for I/O, then it will eventually be remapped back to low memory again.

Yet another procedure that avoids overpopulation of low memory is to remap all PPNs to high memory Mem_H, reset all activity scores a(i) to zero (or whatever other initial value if assumed), and then to begin the activity-driven remapping to low memory Mem_L anew. This may be done at set intervals, for example, or after some period of relative low I/O activity, after completion of some procedure, or at any other appropriate time. Although straightforward and "clean," this approach has the disadvantage of potentially remapping a large number of pages, some of which may still be involved in relatively frequent I/O requests.

Other low-to-high remapping approaches provide greater flexibility. For example, a PPN may be remapped back to high memory if its activity score falls below a low-activity threshold $\tau_L$, which may be determined using the same methods as $\tau_H$. It is preferable that $\tau_L$ should be kept sufficiently less than $\tau_H$ so that remapping is not done too often. This remapping "hysteresis" or "spread" between $\tau_L$ and $\tau_H$ may also be made a function of such factors as the current level of general I/O activity, the proportion of free MPN_L(j), etc.

Still another optional mechanism for dynamic remapping from low back to high memory uses the scarcity ratio ρ defined above. According to this mechanism, either or both of the thresholds $\tau_L$ and $\tau_H$ are adjusted by a function of ρ. For example, $\tau_H$ could be adjusted upward from some predetermined minimum value as a function of ρ; similarly, $\tau_L$ could be adjusted downward from some predetermined maximum value as another function of ρ. As more and more low memory becomes taken, this scheme would require an increasing level of activity in order for a particular PPN(i) to be mapped into the increasingly scarce low memory resource.

The activity scores a(i) may also be calculated in such a manner that they "decay" or grow more or less continuously; in other words, mappings into low memory may be allowed to "age." For example, let c(i,t) be a measure of the I/O activity of PPN(i) during the period (t, t-T). Values for c(i,t) are then preferably also stored as a vector in the page activity module 614. This measure c(i,t) might be the number of times PPN(i) has been involved in I/O during the interval, some function of the percentage of total request I/O operations during the interval that involved PPN(i), etc. To allow for substantially continuous "aging" of mappings, after each interval T, the page-activity module 614 could recalculate a(i)=a(i,t) as follows:

$$a(i,t+T) = \mu * a(i,t) + (1-\mu) * c(i,t+T) \qquad (EQ\ 1)$$

where $\mu$ is a constant that may be chosen using known theoretical and experimental methods to provide a desired degree of "memory" and, preferably, to keep a(i) always within some normalized range. The more frequently PPN(i) is involved in I/O operations, the larger its activity score will grow to be. Its score will drop, however, as the frequency of use of PPN(i) decreases. Using such an aging function also has the effect of smoothing out the frequency of remapping operations, but it therefore also introduces a lag that will depend on $\mu$.

Other aging functions may of course also be used. For example, whereas the formula for calculating a(i,t) shown above is recursive and takes into account all I/O activity for PPN(i) that has taken place since the scores a(i) were most recently reset, it would also be possible to use an aging function of only the current and the previous m activity intervals. Thus, one could also calculate the activity score for a particular PPN(i) as follows:

$$a(i,t)=\mu_0*c(i,t)+\mu_1*c(i,t-T)+\mu_2*c(i,t-2T)+\ldots+\mu_m*c(i,t-mT) \text{ (EQ 2)}$$

where m and the weights $\mu_0, \mu_1, \mu_2, \ldots, \mu_m$ may be chosen using normal design methods. The advantage of the recursive formula in EQ 1, however, is that it requires only two storage spaces per PPN(i) and fewer additions and multiplications than the (m+1)-element formula EQ 2.

In addition to (or instead of) remapping pages from high to low memory (or vice versa) as a function of activity, remapping may also be made contingent on cost: According to this optional aspect of the invention, for a given page PPN(i), the manager, for example, a cost-evaluation module 618 (FIG. 2), keeps track of the amount of copying overhead incurred while doing I/O for that page, and then remaps when this copying overhead exceeds the actual remap cost (or some function of the actual remap cost). Note that it will generally be easy to estimate the cost of a page copy, since it is nearly constant in most cases.

The cost-evaluation module 618 may, additionally, also be used to implement a "global" decision mechanism that determines whether any remapping should be performed or continued at all. According to this aspect of the invention, the module 618 evaluates the current cost of remapping and if this cost rises above a predetermined threshold, then page remapping is at least temporarily discontinued until the cost function once again drops below the threshold. While remapping is suspended, I/O requests to "high" memory may be carried out by copying the data for each requested page (for write operations), each time it is requested, to the low-memory buffer 620 as in the prior art. (For read operations it is necessary only to allocate a buffer page, possibly with partial page copying as mentioned above, and to copy the input data to the subsystem that requested the read.)

As is mentioned above, in systems such as those with the Intel x86 architecture, a page is the smallest unit of memory than can typically be remapped. I/O requests, however, may be of any size, that is, less (even much less) than a page, exactly a page, or larger (even much larger) than a page (which also means it will occupy more than one page). For example, most DMA uses what are known as "scatter-gather lists" for an I/O request, where each element of a list is an <address, length> pair.

In cases where an I/O request spans more than one page, the corresponding pages may be (but need not be) contiguous (that is, numerically adjacent) as PPNs; however, depending on the implementation, the MPNs these PPNs map to may not be contiguous. The remapping techniques of the invention described above may in such cases also be used to ensure mapping to contiguous MPNs. For example, a single element for an 8K write to contiguous PPNs might be converted to two 4K writes to their corresponding non-contiguous MPNs. The manager 605 could then use the remapping procedure according to the invention to copy/remap so that the element is contiguous in MPN space as well in PPN space. In short, the invention may be used to remap non-contiguous pages to contiguous pages. This would then avoid the need for page splits on future transfers and will improve performance accordingly.

Although page remapping as such is a known technique with a variety of applications, those skilled in the art of operating system design will now appreciate that several aspects of its implementation according to the invention are not only novel but also provide particular advantages. First, according to the invention, page remapping is used in a manner that helps avoid expensive copy operations while performing I/O operations to devices that have limited addressing capabilities. Second, in the preferred, virtualized embodiment of the invention shown in FIG. 3, the invention exploits the extra level of indirection made possible by virtualization in order to transparently remap (virtualized) "physical" memory in the guest OS that is running on the VM. By way of contrast, note that in a conventional OS, it is not possible to remap "physical" memory at all, which is accessed directly by devices via DMA. Finally, the invention provides for an adaptive remapping process that uses dynamic statistics to reduce the need for copying of pages.

We claim:

1. A method for performing an input/output (I/O) operation in a computer between an I/O-initiating subsystem and a device through a memory, in which:

the memory is arranged into portions that are separately addressable using first identifiers;

for the I/O operation, the device accesses a device-accessible space of the memory;

the subsystem addresses I/O requests to a device-inaccessible space of the memory using second identifiers;

the method comprising the following steps:

initially mapping the second identifiers to respective first identifiers that identify portions of the memory in the device-inaccessible memory space; and for any I/O request that meets a remapping criterion, remapping the corresponding second identifier to one of the first identifiers that identifies a portion of the memory in the device-accessible space of the memory.

2. A method as in claim 1, in which the I/O operation is output of a data set from the subsystem to the device, the method further comprising the following step:

for any I/O request that meets the remapping criterion, and for as long as the I/O request meets the remapping criterion, creating and maintaining a single copy of the data set in a buffer in the device-accessible space of the memory and remapping the I/O request to the single copy.

3. A method as in claim 2, further comprising, for any I/O request that fails to meet the remapping criterion, creating a new copy of the data set in the buffer upon each instance of the I/O request.

4. A method as in claim 2, further comprising the following step:

for each second identifier that is currently mapped into the device-accessible space of the memory and that meets a remapping condition, again mapping the second identifier into the device-inaccessible space of the memory.

5. A method as in claim 4, further including the step of randomly selecting each second identifier that is to be again mapped into the device-inaccessible space of the memory, whereby the remapping condition is that each respective second identifier page is one of those that has been randomly selected.

6. A method as in claim 4, further comprising the step of freeing for reallocation the portion of the memory in the device-accessible space to which the second identifier had previously been remapped.

7. A method as in claim 1, in which the I/O operation is input of a data set from the device to the subsystem, the method further comprising the following step:

for any I/O request that meets the remapping criterion, storing the data set from the device in the device-accessible space of the memory at a location identified by the first identifier to which the second identifier has been remapped.

8. A method as in claim 1, further comprising the step of calculating an activity score for at least a subset of the second identifiers used by the subsystem in an I/O request during a current measurement period, in which the remapping criterion is that the activity score exceeds a high-activity threshold value.

9. A method as in claim 8, in which the activity score is a function of the frequency of use in I/O requests by the subsystem of the respective second identifier.

10. A method as in claim 9, in which the activity score is a function of the frequency of use in I/O requests by the I/O-initiating subsystem of the respective second identifier over both a current activity interval and over at least one previous activity interval.

11. A method as in claim 10, in which the function is a weighted sum.

12. A method as in claim 8, further comprising the following step:

for each second identifier that is currently mapped to one of the first identifiers identifying a portion of the memory in the device-accessible space of the memory and that meets a remapping condition, again mapping the second identifier to a first identifier identifying a portion of the memory in the device-inaccessible space of the memory.

13. A method as in claim 12, further including the step of randomly selecting each second identifier that is to be again mapped to a first identifier identifying a portion of the memory in the device-inaccessible space of the memory, whereby the remapping condition is that each respective second identifier page is one of those that has been randomly selected.

14. A method as in claim 12, in which the remapping condition is that the activity score of each respective page falls below a low-activity threshold during a most recent activity interval.

15. A method as in claim 12, further comprising the step of freeing for reallocation the portion of the memory in the device-accessible space to which the second identifier had previously been remapped.

16. A method as in claim 8, further comprising the following steps:

measuring a value of scarcity of portions of the memory in the device-accessible space that are available for allocation; and adjusting the remapping criterion as a function of the value of scarcity.

17. A method as in claim 16, in which the step of adjusting the remapping criterion as a function of the value of scarcity comprises calculating the high-activity threshold value according to the value of scarcity.

18. A method as in claim 1, further comprising the step of evaluating a current cost of remapping for the current I/O request, whereby the remapping criterion is that the current cost is less than a cost threshold.

19. A method as in claim 1, is which the I/O-initiating subsystem is included within a guest system that runs on a host platform, the method further comprising the following steps:

within the guest system, remapping I/O requests issued by the I/O-initiating subsystem from third identifiers to the second identifiers;

the step of remapping the second identifiers to the first identifiers remaining transparent to both the I/O-initiating subsystem and the guest system.

20. A method as in claim 19, in which:

the guest system is a virtual machine;

remapping of the third identifiers to the second identifiers is done in a guest operating system within the virtual machine;

remapping the second identifiers to the first identifiers is done in an intermediate software layer between the guest system and the host platform;

the I/O requests are directed to a virtual device through a virtual memory within the virtual machine, whereby the third identifiers address the virtual memory; and the first identifiers address a hardware memory.

21. A method as in claim 20, in which the I/O operation uses direct memory access (DMA).

22. A method as in claim 1, in which the memory portions are pages, and the first and second identifiers are page numbers.

23. A method as in claim 1, in which the step of remapping further comprises remapping second identifiers that identify contiguous memory portions such that the first identifiers to which they are remapped correspond to contiguous portions of the device-accessible space.

24. A method for performing an input/output (I/O) operation in a computer between an I/O-initiating subsystem and a device via a device-accessible space of a memory, in which:

the memory is arranged into portions that are separately addressable using first identifiers;

the subsystem addresses I/O requests to a device-inaccessible space of the memory using second identifiers;

the device accesses the device-accessible space of the memory;

the method comprising the following steps:

initially mapping the second identifiers to respective first identifiers that identify portions of the memory in the device-inaccessible space;

calculating an activity score for each second identifier used by the subsystem in an I/O request during a current measurement period as a function of the frequency of use in I/O requests by the subsystem of the respective second identifier; and for any I/O request involving a second identifier whose activity score exceeds a high-activity threshold value that meets a remapping criterion, remapping the corresponding second identifier to one of the first identifiers that identifies a portion of the memory in the device-accessible space of the memory.

25. A method for performing an input/output (I/O) operation in a computer between an I/O-initiating subsystem and a physical device through a hardware memory, in which:

the hardware memory is arranged into portions that are separately addressable using first identifiers;

the physical device accesses a device-accessible space of the hardware memory;

the I/O-initiating subsystem is located within a virtual machine that has a guest operating system and that is running on a host platform via an intermediate software layer;

the I/O-initiating subsystem directs I/O requests, using third identifiers, to a virtual device through a virtual memory;

the method comprising the following steps:

in the guest operating system, remapping I/O requests issued by the I/O-initiating subsystem from the third identifiers to second identifiers, which identify portions of the virtual memory;

in the intermediate software layer, initially mapping intermediate identifiers to respective first identifiers that identify portions of the hardware memory in a device-inaccessible space of the hardware memory, where the intermediate identifiers are chosen from the group consisting of the second and the third identifiers; and for any I/O request that meets a remapping criterion, remapping the corresponding intermediate identifier to one of the first identifiers that identifies a portion of the memory in the device-accessible space of the memory.

26. A method as in claim 25, in which the I/O operation is output of a data set from the subsystem to the physical device, the method further comprising the following step:

for any I/O request that meets the remapping criterion, and for as long as the I/O request meets the remapping criterion, creating and maintaining a single copy of the data set in a buffer in the device-accessible space of the memory and remapping the I/O request to the single copy.

27. A method as in claim 26, further comprising the following step:

for each intermediate identifier that is currently mapped into the device-accessible space of the memory and that meets a remapping condition, again mapping the intermediate identifier into the device-inaccessible space of the memory.

28. A method as in claim 25, in which the I/O operation is input of a data set from the physical device to the subsystem, the method further comprising the following step:

for any I/O request that meets the remapping criterion, storing the data set from the device in the device-accessible space of the memory at a location identified by the first identifier to which the intermediate identifier has been remapped.

29. A method as in claim 25, further comprising the step of calculating an activity score for each intermediate identifier used in an I/O request during a current measurement period, in which the remapping criterion is that the activity score exceeds a high-activity threshold value.

30. A method as in claim 29, in which the activity score is a function of the frequency of use in I/O requests of the respective intermediate identifier.

31. A method as in claim 29, further comprising the following step:

for each intermediate identifier that is currently mapped to one of the first identifiers identifying a portion of the memory in the device-accessible space of the memory and that meets a remapping condition, again mapping the intermediate identifier to a first identifier identifying a portion of the memory in the device-inaccessible space of the memory.

32. A method as in claim 29, further comprising the following steps:

measuring a value of scarcity of portions of the memory in the device-accessible space that are available for allocation; and adjusting the remapping criterion as a function of the value of scarcity.

33. A method as in claim 25, further comprising the step of evaluating a current cost of remapping for the current I/O request, whereby the remapping criterion is that the current cost is less than a cost threshold.

34. A method as in claim 25, in which the memory portions are pages, and all the identifiers are page numbers.

35. A method as in claim 25, in which the step of remapping further comprises remapping intermediate identifiers that identify contiguous memory portions such that the first identifiers to which they are remapped correspond to contiguous portions of the device-accessible memory space.

36. A system for performing an input/output (I/O) operation in a computer between an I/O-initiating subsystem and a device through a memory, in which:

the memory is arranged into portions that are separately addressable using first identifiers;

for the I/O operation, the device accesses a device-accessible space of the memory;

the subsystem addresses I/O requests to a device-inaccessible space of the memory using second identifiers;

the system comprising:

a manager that forms an interface between the I/O-initiating subsystem on the one hand and the device and memory on the other hand and that includes:

a memory map initially mapping the second identifiers to respective first identifiers that identify portions of the memory in the device-inaccessible memory space; and a remapping module forming means for remapping at least one of the second identifiers that is used in any I/O request and that meets a remapping criterion to one of the first identifiers that identifies a portion of the memory in the device-accessible space of the memory.

37. A system as in claim 36, in which the I/O operation involves output of a data set from the subsystem to the device, the system further comprising:

a page copy buffer in the device-accessible space of the memory for storing, for any I/O request that meets the remapping criterion, and for as long as the I/O request meets the remapping criterion, a single copy of the data set;

the remapping module being further provided for remapping the I/O request to the single copy.

38. A system as in claim 37, in which the remapping module is further provided for again mapping into the device-inaccessible space of the memory each second identifier that is currently mapped into the device-accessible space of the memory and that meets a remapping condition.

39. A system as in claim 36, further comprising an activity-measuring module forming means for calculating an activity score for at least a subset of the second identifiers used by the subsystem in an I/O request during a current measurement period, the remapping criterion being that the activity score exceeds a high-activity threshold value.

40. A system as in claim 39, in which the remapping module is further provided for again mapping into the device-inaccessible space of the memory each second identifier that is currently mapped into the device-accessible space of the memory and that meets a remapping condition.

41. A system as in claim 36, further comprising a cost evaluation module forming means for evaluating a current cost of remapping the current I/O request and for comparing the current cost with a cost threshold, the remapping criterion being that the current cost is less than the cost threshold.

42. A system as in claim 36, in which:
the I/O-initiating subsystem is included within a guest system that runs on a host platform;
the guest system includes memory mapping means for mapping I/O requests issued by the I/O-initiating subsystem from third identifiers to the second identifiers; and
the remapping module is further provided for remapping the second identifiers to the first identifiers such that the remapping remains transparent to both the I/O-initiating subsystem and the guest system.

43. A system as in claim 42, further comprising:
an intermediate software layer;
in which:
the guest system is a virtual machine that includes a guest operating system, a virtual memory, and a virtual device;
the intermediate software layer forms an interface between the virtual machine and the host platform;
the remapping module is in the intermediate software layer;
the memory mapping means in the guest system is part of a guest operating system within the virtual machine;
the I/O requests are directed to the virtual device through the virtual memory, the third identifiers addressing the virtual memory; and
the first identifiers address a hardware memory.

44. A system as in claim 36, in which the I/O operation involves direct memory access (DMA).

45. A system as in claim 36, in which the memory portions are pages, and the first and second identifiers are page numbers.

46. A system as in claim 36, in which the remapping module is further provided for remapping second identifiers that identify contiguous memory portions such that the first identifiers to which they are remapped correspond to contiguous portions of the device-accessible space.

47. A system for performing an input/output (I/O) operation in a computer between an I/O-initiating subsystem and a device through a hardware memory, in which:
the hardware memory is arranged into portions that are separately addressable using first identifiers;
the physical device accesses a device-accessible space of the hardware memory for the I/O operation;
the I/O-initiating subsystem is located within a virtual machine that has a guest operating system, a virtual memory, and a virtual device;
the I/O-initiating subsystem directs I/O requests, using third identifiers, to the virtual device through the virtual memory;
the system comprising:
an intermediate software layer that forms an interface between the virtual machine on the one hand and the physical device and hardware memory on the other hand and that includes:
a memory map initially mapping intermediate identifiers to respective first identifiers that identify portions of the memory in the device-inaccessible memory space, the intermediate identifiers being chosen from the group consisting of the second and the third identifiers; and
a remapping module forming means for remapping at least one of the intermediate identifiers that is used in any I/O request and that meets a remapping criterion to one of the first identifiers that identifies a portion of the hardware memory in the device-accessible space of the hardware memory.

48. A system as in claim 47, in which the I/O operation involves output of a data set from the subsystem to the physical device, the system further comprising:
a page copy buffer in the device-accessible space of the hardware memory for storing, for any I/O request that meets the remapping criterion, and for as long as the I/O request meets the remapping criterion, a single copy of the data set;
the remapping module being further provided for remapping the I/O request to the single copy.

49. A system as in claim 48, in which the remapping module is further provided for again mapping into the device-inaccessible space of the hardware memory each intermediate identifier that is currently mapped into the device-accessible space of the hardware memory and that meets a remapping condition.

50. A system as in claim 47, further comprising an activity-measuring module forming means for calculating an activity score for at least a subset of the intermediate identifiers used an I/O request during a current measurement period, the remapping criterion being that the activity score exceeds a high-activity threshold value.

51. A system as in claim 50, in which the remapping module is further provided for again mapping into the device-inaccessible space of the hardware memory each second identifier that is currently mapped into the device-accessible space of the hardware memory and that meets a remapping condition.

52. A system as in claim 47, further comprising a cost evaluation module forming means for evaluating a current cost of remapping the current I/O request and for comparing the current cost with a cost threshold, the remapping criterion being that the current cost is less than the cost threshold.

53. A system as in claim 47, in which the remapping module is further provided for remapping intermediate identifiers that identify contiguous portions of the hardware memory such that the first identifiers to which they are remapped correspond to contiguous portions of the device-accessible space of the hardware memory.

* * * * *